(12) United States Patent
Dodson et al.

(10) Patent No.: US 9,892,066 B1
(45) Date of Patent: **\*Feb. 13, 2018**

(54) DYNAMICALLY ADJUSTING READ DATA RETURN SIZES BASED ON INTERCONNECT BUS UTILIZATION

(71) Applicant: INTERNATIONAL BUSINESS MACHINES CORPORATION, Armonk, NY (US)

(72) Inventors: John S. Dodson, Austin, TX (US); Didier R. Louis, Fontainebleau (FR); Eric E. Retter, Austin, TX (US); Jeffrey A. Stuecheli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,465

(22) Filed: Oct. 31, 2016

(51) Int. Cl.
*G06F 13/00* (2006.01)
*G06F 13/16* (2006.01)
(Continued)

(52) U.S. Cl.
CPC ........ *G06F 13/1642* (2013.01); *G06F 3/0608* (2013.01); *G06F 3/0653* (2013.01); *G06F 3/0685* (2013.01); *G06F 13/38* (2013.01)

(58) Field of Classification Search
CPC .. G06F 13/385; G06F 13/4072; G06F 9/4411; G06F 9/44505; G06F 13/36;
(Continued)

(56) References Cited

U.S. PATENT DOCUMENTS 5,586,297 A 12/1996 Bryg et al.
5,649,153 A 7/1997 McNutt et al.
(Continued)

OTHER PUBLICATIONS

"List of IBM Patents or Patent Applications Treated as Related", dated Oct. 31, 2016, 2 pages.
(Continued)

*Primary Examiner* — Tim T Vo
*Assistant Examiner* — Kim T. Huynh
(74) *Attorney, Agent, or Firm* — Steven L. Bennett; Amy J. Pattillo

(57) ABSTRACT

A memory system comprises a memory device coupled to a memory controller, the memory controller for receiving one or more memory requests from one or more core devices via an interconnect bus. The memory controller tracks utilization of the interconnect bus by tracking a selection of the one or more memory requests with fetched data from the one or more memory devices and waiting for scheduling to return on the interconnect bus during a time window. The memory controller, responsive to detecting utilization of the interconnect bus during the time window reaches a memory utilization threshold, dynamically selects a reduced read data size for a size of the fetched data to be returned with at least one read request from among the selection of one or more memory requests, the reduced data size selected from among at least two read data size options for the at least one read request of a maximum read data size and the reduced read data size that is less than the maximum read data size.

18 Claims, 6 Drawing Sheets

(51) Int. Cl.
*G06F 3/06* (2006.01)
*G06F 13/38* (2006.01)

(58) Field of Classification Search
CPC .... G06F 13/364; G06F 13/42; G06F 13/4286;
G06F 13/4018; G06F 2213/0056; G06F
12/0835; G06F 13/28; G06F 2213/2808;
G06F 2213/2806
USPC ........ 710/33, 34, 39, 56, 307, 308; 711/170,
711/171
See application file for complete search history.

(56) References Cited

U.S. PATENT DOCUMENTS

| | | | |
|---|---|---|---|
| 5,968,153 A | 10/1999 | Wheeler et al. | |
| 6,353,877 B1 | 3/2002 | Duncan et al. | |
| 6,457,081 B1 | 9/2002 | Gulick | |
| 6,499,085 B2 | 12/2002 | Bogin et al. | |
| 6,529,998 B1 | 3/2003 | Yochai et al. | |
| 6,571,322 B2 | 5/2003 | Arimilli | |
| 6,785,793 B2 | 8/2004 | Aboulenein et al. | |
| 6,799,257 B2* | 9/2004 | Sprangle | G06F 13/161 711/158 |
| 6,959,374 B2* | 10/2005 | Schulz | G06F 12/0862 711/213 |
| 7,107,384 B1 | 9/2006 | Chen et al. | |
| 7,139,878 B2 | 11/2006 | Malik et al. | |
| 7,143,246 B2 | 11/2006 | Johns | |
| 7,437,428 B1 | 10/2008 | Muti et al. | |
| 7,526,593 B2 | 4/2009 | Mandal et al. | |
| 7,539,809 B2 | 5/2009 | Juenger | |
| 7,558,887 B2 | 7/2009 | Gower et al. | |
| 7,861,014 B2 | 12/2010 | Gower et al. | |
| 7,958,309 B2 | 6/2011 | Arimilli et al. | |
| 8,117,401 B2 | 2/2012 | Arimilli et al. | |
| 8,250,307 B2 | 8/2012 | Arimilli et al. | |
| 8,266,381 B2 | 9/2012 | Arimilli et al. | |
| 8,473,567 B2* | 6/2013 | Mannava | H04L 65/607 709/216 |
| 8,510,518 B2 | 8/2013 | O'Connor | |
| 8,848,577 B2* | 9/2014 | Saund | G06F 13/1605 370/235 |
| 8,984,231 B2 | 3/2015 | Sun | |
| 9,128,868 B2 | 9/2015 | Lastras-Montano et al. | |
| 9,256,541 B2 | 2/2016 | Sathish et al. | |
| 2003/0167385 A1 | 9/2003 | Lai et al. | |
| 2005/0188121 A1* | 8/2005 | Cho | G06F 12/0862 710/22 |
| 2006/0020598 A1 | 1/2006 | Shoolman et al. | |
| 2007/0255904 A1* | 11/2007 | Frank | G06F 13/1642 711/118 |
| 2009/0019239 A1* | 1/2009 | Allison | G06F 13/1642 711/151 |
| 2009/0157919 A1* | 6/2009 | Dodson | G06F 13/4022 710/57 |
| 2011/0125947 A1* | 5/2011 | Dodson | G06F 13/385 710/112 |
| 2011/0314231 A1* | 12/2011 | O'Connor | G06F 13/161 711/154 |
| 2013/0103783 A1 | 4/2013 | Mannava et al. | |
| 2014/0143612 A1 | 5/2014 | Gollub et al. | |
| 2014/0325159 A1 | 10/2014 | Meredith et al. | |
| 2014/0351525 A1 | 11/2014 | Chen et al. | |

OTHER PUBLICATIONS

U.S. Appl. No. 15/339,406, filed Oct. 31, 2016, in re Dodson, 44 pages.
Lu, Tianye et al, "Achieving Efficient Packet-based Memory System by Exploiting Correlation of Memory Requests", 2014, EDAA, 6 pages.
Cuppu, Vinodh et al., "Concurrency, Latency, or System Overhead: Which Has the Largest Impact on Uniprocessor DRAM-System Performance?", Department of Electrical and Computer Engineering, University of Maryland, College Park, 2001 IEEE, 10 pages.
Yoon, Doe Hyun et al, "Adaptive Granularity Memory Systems: A Tradeoff between Storage Efficiency and Throughput", ACM 2011, 12 pages.
Hur, Ibrahim, "Feedback Mechanisms for Improving Probabilistic Memory Prefetching", IEEE 2009, accessed online at <https://www.cs.utexas.edu/~lin/papers/hpca09.pdf>, 12 pages.
Kim, Yoongu et al, "Thread Cluster Memory Scheduling: Exploiting Differences in Memory Access Behavior", Carnegie Mellon University, IEEE, 2010, 12 pages.
Agarwal, Deepak et al, "Exploiting Application—Level Information to Reduce Memory Bandwidth Consumption", University of Maryland at College Park, May 22, 2003, 13 pages.
Park et al., "Future Cache Design using STT MRAMs for Improved Energy Efficiency: Devices, Circuits and Architecture", 49th ACM/EDAC/IEEE Design Automation Conference (DAC), Jun. 2012, pp. 492-497, IEEE Xplore Digital Library (online), ISBN: 978-1-4503-1199-1, DOI: 10.1145/2228360.2228447.
Notice of Allowance, dated Feb. 13, 2017, U.S. Appl. No. 15/339,406, filed Oct. 31, 2016, In re Dodson.

* cited by examiner

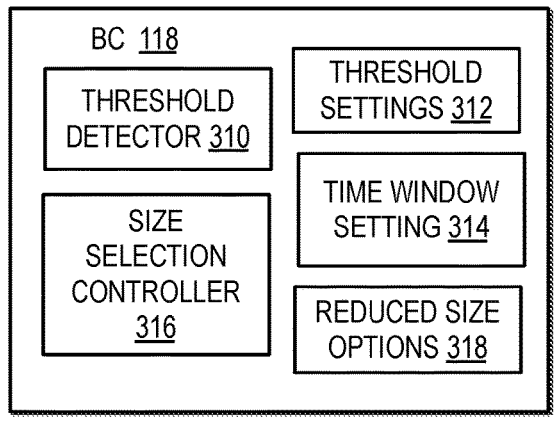
FIG. 3
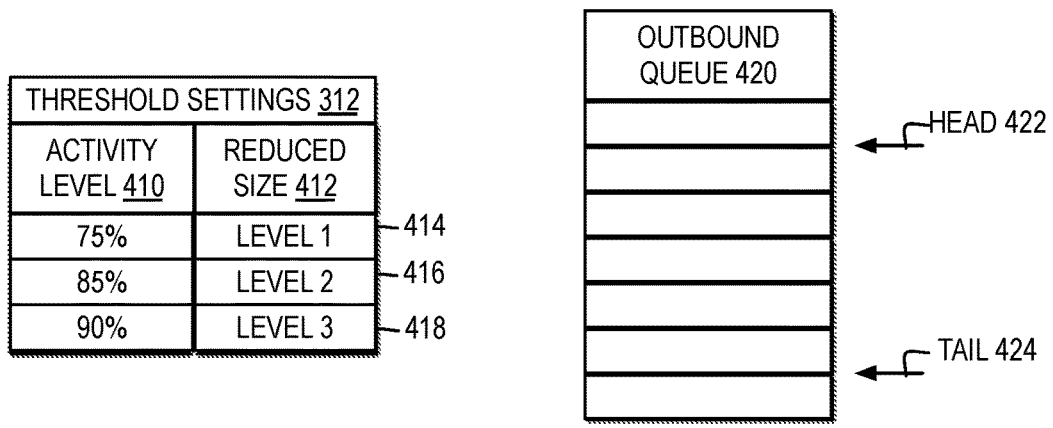
FIG. 4
FIG. 5

| OUTBOUND QUEUE 600 | | | | |
|---|---|---|---|---|
| CORE ID 610 | SELECTED DATA SIZE 612 | VARIABLE SETTING 614 | REDUCED DATA SETTING 616 | |
| CORE 1 | READ 16X -> 8X | ON | 8X | -620 ←—LEVEL 1 |
| CORE 3 | READ 16X | OFF |  | -622 |
| CORE 4 | READ 16X | ON | 01 | -624 ←— NO |
| CORE 2 | READ 32X | ON | THRESHOLD | -626 ←—LEVEL 2 |

*FIG. 6*

| LOAD QUEUE 700 | | | |
|---|---|---|---|
| CORE ID 710 | VARIABLE SETTING 714 | LOWER BANDWIDTH 718 | |
| CORE 1 | ON | YES | -720 ←—LEVEL 1 |
| CORE 2 |  |  | -722 |
| CORE 4 | ON |  | -724 |
| CORE 2 | ON |  | -726 |

*FIG. 7*

DYNAMICALLY ADJUSTING READ DATA RETURN SIZES BASED ON INTERCONNECT BUS UTILIZATION

BACKGROUND

1. Technical Field

The embodiment of the invention relates generally to memory management and particularly to dynamically adjusting read data return sizes based on interconnect bus utilization to optimize read return data traffic on an interconnect bus.

2. Description of the Related Art

A memory controller handles memory requests to off-core memory devices received on an interconnect bus from one or more cores. The memory controller schedules the use of bandwidth on a memory interface bus for passing the memory requests to one or more memory devices and receiving responses to the memory requests. Memory requests include read requests, for reading data from the one or more memory devices, and write requests, for writing data to the one or more memory devices. In addition, the memory controller schedules the use of bandwidth on the interconnect bus for returning responses to read requests, including the data fetched from a memory device in response to a read request.

BRIEF SUMMARY

In one or more embodiments, a memory system comprises a memory controller coupled to one or more memory devices via a memory interface bus. The memory system comprises the memory controller coupled to one or more core devices via an interconnect bus. The memory system comprises the memory controller for receiving one or more memory requests from the one or more core devices via the interconnect bus. The memory system comprises the memory controller for tracking utilization of the interconnect bus by tracking a selection of the one or more memory requests comprising one or more read request returns with fetched data from the one or more memory devices waiting for scheduling to return on the interconnect bus during a time window. The memory system comprises the memory controller, responsive to detecting utilization of the interconnect bus during the time window reaches a memory utilization threshold, detecting a particular level identified with the memory utilization threshold, from among a plurality of memory utilization thresholds each identified by a separate level, for at least one read request from among the selection of one or more memory requests, identifying a particular reduced read data size specified for the particular level, the particular reduced data size for the particular level selected from among at least two read data size options for the at least one read request of a maximum read data size and the reduced read data size that is less than the maximum read data size, and dynamically selecting a reduced read data size set to the particular reduced read data size for a size of the fetched data to be returned for the at least one read request.

In one or more embodiments, a method is directed to, a computer system receiving one or more memory requests from one or more core devices via an interconnect bus, the one or more memory requests for accessing one or more memory devices via a memory interface bus. The method is directed to the computer system tracking utilization of the interconnect bus by tracking for a selection of the one or more memory requests comprising one or more read request returns with fetched data from the one or more memory devices waiting for scheduling to return on the interconnect bus during a time window. The method is directed to the computer system, responsive to detecting utilization of the interconnect bus during the time window reaches a memory utilization threshold, detecting a particular level identified with the memory utilization threshold, from among a plurality of memory utilization thresholds each identified by a separate level, for at least one read request from among the selection of one or more memory requests, identifying a particular reduced read data size specified for the particular level, the particular reduced data size for the particular level selected from among at least two read data size options for the at least one read request of a maximum read data size and the reduced read data size that is less than the maximum read data size, and dynamically selecting a reduced read data size set to the particular reduced read data size for a size of the fetched data to be returned for the at least one read request.

In addition, in one or more embodiments, a computer program product comprises one or more computer-readable storage devices and program instructions, stored on at least one of the one or more storage devices. The stored program instructions comprise program instructions to receive one or more memory requests from one or more core devices via an interconnect bus, the one or more memory requests for accessing one or more memory devices via a memory interface bus. The stored program instructions comprise program instructions to track utilization of the interconnect bus by tracking a selection of the one or more memory requests comprising one or more read request returns with fetched data from the one or more memory devices waiting for scheduling to return on the interconnect bus during a time window. The stored program instructions comprise program instructions to, responsive to detecting utilization of the interconnect bus during the time window reaches a memory utilization threshold, detecting a particular level identified with the memory utilization threshold, from among a plurality of memory utilization thresholds each identified by a separate level, for at least one read request from among the selection of one or more memory requests, identifying a particular reduced read data size specified for the particular level, the particular reduced data size for the particular level selected from among at least two read data size options for the at least one read request of a maximum read data size and the reduced read data size that is less than the maximum read data size, and dynamically select a reduced read data size set to the particular reduced read data size for a size of the fetched data to be returned for the at least one read request.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 3 illustrates one example of a block diagram of a bandwidth controller for dynamically adjusting read data return sizes based on interconnect bus utilization to optimize read request return data traffic on the interconnect bus;

FIG. 4 illustrates one example of a block diagram of elements of threshold settings in a bandwidth controller for dynamically adjusting read data return sizes if interconnect bus utilization exceeds a threshold setting to optimize read request return data traffic on the interconnect bus;

FIG. 5 illustrates one example of a block diagram of elements of reduced size option settings in a bandwidth controller for dynamically reducing read data return sizes according to the reduced size options settings if interconnect bus utilization exceeds a threshold setting to optimize read data traffic on the interconnect bus;

FIG. 6 illustrates one example of a block diagram of multiple read request returns waiting in a queue, including multiple read request returns with a variable size setting;

FIG. 7 illustrates one example of a block diagram of multiple loads tracked in a queue at a bus controller, including multiple loads for read requests with a variable size setting, indicating whether the target of the load is a lower bandwidth memory device;

DETAILED DESCRIPTION

In the following description, for the purposes of explanation, numerous specific details are set forth in order to provide a thorough understanding of one or more embodiments of the present invention. It will be apparent, however, to one skilled in the art that the one or more embodiments of the present invention may be practiced without these specific details. In other instances, well-known structures and devices are shown in block diagram form in order to avoid unnecessarily obscuring the one or more embodiments of the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
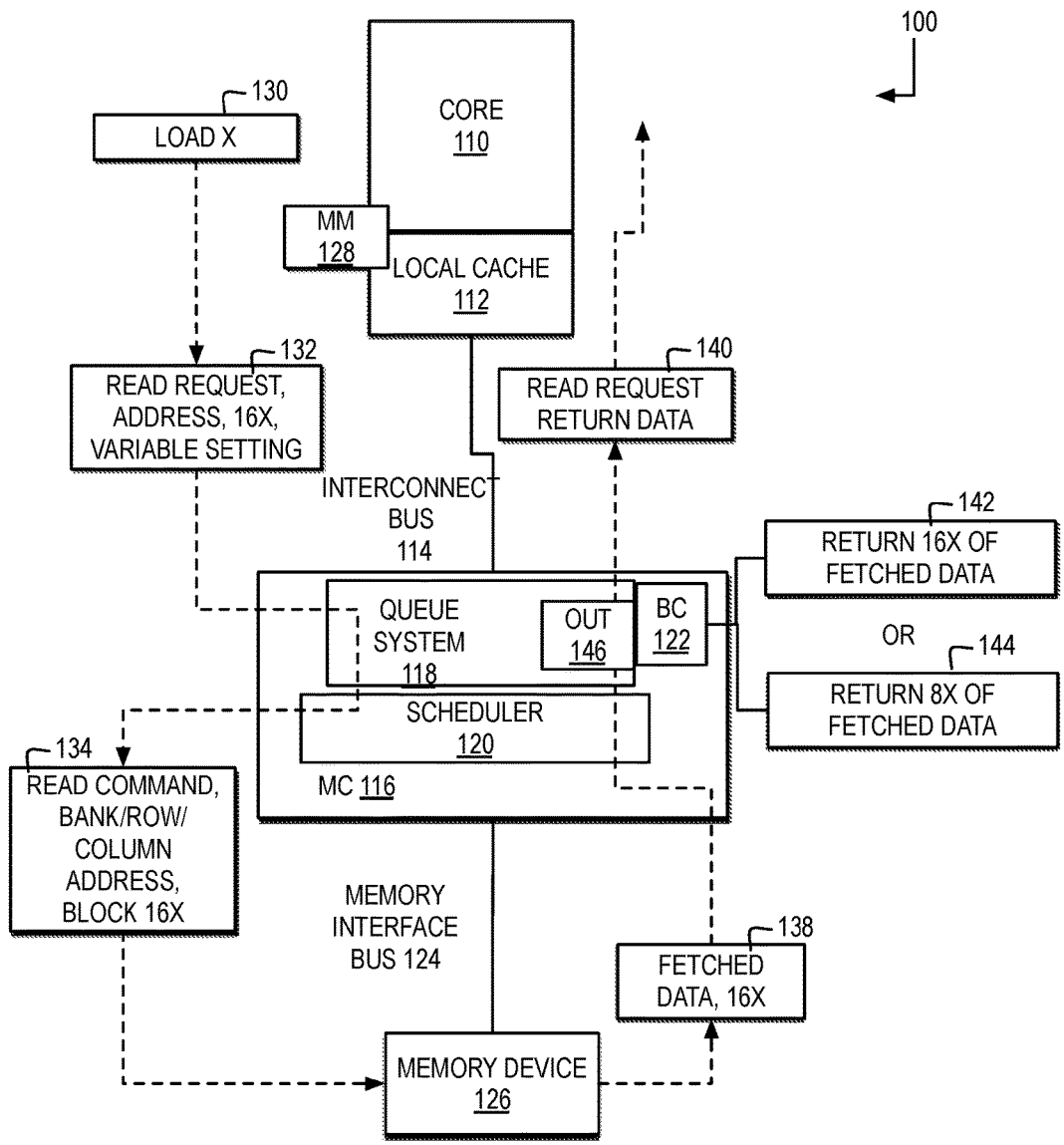
FIG. 1 illustrates one example of block diagram of a memory controller for dynamically adjusting read data return sizes from a memory controller based on interconnect bus utilization to reduce read return data traffic on the memory interconnect bus.

FIG. 1 illustrates a block diagram of one example of a memory controller for dynamically adjusting read data return sizes from a memory controller based on interconnect bus utilization to reduce read return data traffic on the interconnect bus.

In one example, a computing system 100 includes one or more memory devices, such as a memory device 126 and memory control elements for managing memory accesses to memory device 126. In one example, the memory control elements may include, but are not limited to, a memory controller 116, an interconnect bus 114 connecting one or more cores to a memory controller 116, and a memory interface bus 124 for connecting memory controller 116 to memory device 126. In one example, memory device 126 represents one or more dynamic random access memory (DRAM) devices.

In one example, one or more processors, such as a core 110, may send memory access requests, such as read requests and write requests, to memory device 126 via interconnect bus 114, connecting core 110 to MC 116. In one example, interconnect bus 114 may include one or more data buses, of one or more widths, for transferring packets of data between memory controller 116 and core 110, and one or more address busses, of a width that may indicate the amount of system memory a core can read or write into, for transferring addresses and memory request information. In one example, interconnect bus 114 may include multiple cards and slots running at different bandwidths. In one example, MC 116 may be connected to one or more cards and slots of interconnect bus 114. In one example, core 110 may be connected to one or more cards and slots of interconnect bus 114. In one example, interconnect bus 114 may represent one or more computer buses using one or more Peripheral Component Interconnect (PCI) standards and may integrate both serial interconnect and parallel interconnect PCI standards.

In one example, MC 116 manages receiving memory access requests from interconnect bus 114 and buffering each memory access request in a queue system 118. In one example, queue system 118 may include one or more queues for managing memory access requests identified as read requests and one or more queues for managing memory access requests identified as write requests. In one example, queue system 118 may include multiple queues or other types of buffers, and multiple types of queue or buffer management systems, for efficiently managing buffering of read requests and write requests received from interconnect bus 114 to improve performance.

A scheduler 120 of MC 116 manages scheduling of queued memory access requests from queue system 118 to read from or write to memory device 126 via a memory interface bus 124. In one example, scheduler 120 may implement one or more types of scheduling methods for efficiently managing the scheduling of read requests and write requests on memory interface bus 124 based on the architecture of memory device 126, following timing constraints and refreshes required for proper operation of memory device 126. For example, one of multiple timing constraints required for proper operation of memory device 126 may include a minimum number of cycles to wait before issuing a read command after a write command is issued and a minimum number of cycles to wait before issuing a write command after a read command is issued because it may take time to reverse the direction of the data bus of memory interface bus 124.

In one example, memory interface bus 124 may include one or more types of connections required to read from and write to memory device 126 and to select to refresh memory device 126. In one example, memory interface bus 124 may include multiple parallel lines available to communicate with memory device 126. In one example, the width of memory interface bus 124, measured in bits, may refer to the number of parallel lines available. In another example, memory interface bus 124 may include a serial data link between MC 116 and memory device 126.

In one example, when scheduler 120 schedules a particular queued read request from queue system 118 to read from memory device 126, scheduler 120 may send a read command and bank, row and column address to read from on memory bus interface 124 as inputs to memory device 126. In one example, memory device 126 may be organized in multiple banks of memory, with data blocks identified by a row and column. In one example, memory device 126 uses the bank, row and column inputs to select the correct memory location, active and buffer an identified row, if not already activated, fetch the requested data, consolidate the data in order to reduce the required bus width for the operation, and return the fetched data on memory bus interface 124 as output from memory device 126.

In addition, queue system 118 may include one or more queues for queuing data read from memory device 126, such as a first in first out outbound queue (OUT) 146. Scheduler 120 of MC 116 may manage scheduling of data fetched from memory device 126, waiting in outbound queue 146 for output on interconnect bus 114, to return to the core requesting the data. In one example, when scheduler 120 is ready to schedule the data fetched for a read request from outbound queue 146 onto interconnect bus 114, MC 116 may convert the data into packets and push the packets on interconnect bus 114 as read request return data. In one example, a single core or multiple cores may send memory access requests to MC 116 on interconnect bus 114 and scheduler 120 may manage efficient scheduling of return data on interconnect bus 114 to the core that sent the memory access request.

In one example, due to data bandwidth characteristics, scheduling conflicts with other cores or memory devices, and physical constraints on interconnect bus 114, such as limitations on the number of wire layers available for data bus routing or limitations on the chip package pins available for chip to chip connections, interconnect bus 114 may not return data as quickly as MC 116 fetches data for data requests and queues data in outbound queue 146. In one example, when interconnect bus 114 is not returning data as quickly as MC 116 fetches data for data requests, fetched data with data requests may backup in outbound queue 146 within queue system 118.

In one example of a read request passed from core 110 and a read request return to core 110, as illustrated in FIG. 1, core 110 may process a load command for loading a particular length of data from a particular location in memory. In one example, core 110 may process a load command illustrated at reference numeral 130 as "LOAD X" for loading data from a particular address in a register. In one example, "X" may represent a number of bytes of memory to be accessed starting from a particular memory address loaded in a register. For example, X may represent 8 bytes.

In one example, core 110 may process the "LOAD X" command illustrated at reference numeral 130 by first searching for the requested data from a local cache 112 coupled to core 110 to determine whether a current copy of the data at an address requested by the "LOAD X" command illustrated at reference numeral 130 is currently loaded into local cache 112. In one example, local cache 112 may represent a high speed, local cache that stores and manages a local copy of data previously accessed from memory device 126, for efficient, high speed access to the data by core 110.

In one example, a memory manager (MM) 128 of core 110 may monitor the status of searches of local cache 112.

In one example, if MM 128 detects a cache miss for the requested data for the "LOAD X" command illustrated at reference numeral 130, MM 128 may manage sending a read request for the requested data to an off-core memory, such as memory device 126. In one example, core 110 may include multiple pins that are specified for and connected to interconnect bus 114 that allow MM 128 to send a memory read request on interconnect bus 114 to MC 116 and receive a length of data that is X or multiple times the length of X.

In one example, MM 128 may include functionality that selects, when sending a read request for the "LOAD X" command illustrated at reference numeral 130, whether to select a data size for the read request to memory device 126 that is a multiple larger than X. In one example, as illustrated at reference numeral 132, MM 128 may select to send the "LOAD X" command as a read request "READ REQUEST, ADDRESS, 16X" to memory, where the read request specifies a memory address location and a data size of the read request. In the example, the data size of the read request is set to an amount that is 16 times X (16X). One of ordinary skill in the art will appreciate that MM 128 of core 110 may include memory controller components integrated core 110, local cache 112, and other systems of computer system 100. In additional or alternate embodiments, core 110 may include one or more levels of memory manager components and may include additional or alternate levels of local cache and local memory management. In additional or alternate embodiments MM 128 may select to increase a data size in read request by additional or alternate multiples of X.

In one example, when a cache miss is detected in local cache 112 for a load command and MM 128 sends an off-chip read request for the load command to memory device 126, a result is that bandwidth, power and other processing resources are required for sending the read request on interconnect bus 114, receiving the read request in queue system 118 of MC 116, scheduling the read request by scheduler 120, placing the read request on memory interface bus 124, returning the fetched data for the read request on memory interface bus 124, placing the fetched data in queue 118 to wait for scheduling and placement on interconnect bus 114, and sending the fetched data as read request return data on interconnect bus 114 back to core 110. In one example, to optimize the use of memory control elements and pins allocated for buses, when off-chip read requests are required, MM 128 may increase the read request from an initial length of X to a maximum longer length, such as a length of 16X, as illustrated at reference numeral 132, to read a larger block of memory from memory device 126 than is requested in "LOAD X" and to load the larger block of memory in the read request return data block into local cache 112, in order to increase the probability that a subsequent load request may result in a cache hit in local cache 112 from within the larger block of memory.

In one example, while off-core memory fetching and caching of additional data blocks from memory device 126 with a read request may improve future core efficiency when for a subsequent load instruction there is a cache hit to the additional fetched data in local cache 112, fetching and returning the additional data blocks from memory device 126 places a burden on interconnect bus 114. In particular, the amount of bus bandwidth required on interconnect bus 114 for returning packets for a fetched 16X block of memory from memory device 126 may be significantly greater than the amount of bandwidth required to return packets for only 8X block or X block of the 16X block of memory fetched from memory device 126. In addition, while off-core memory fetching and caching of additional data blocks from memory device 126 with a read request may improve future core efficiency when for a subsequent load instruction there is a cache hit to the additional fetched data in local cache 112, if the data required for subsequent load requests is not sequential within the additional fetched data, the additional fetched data may not be used or even if the additional fetched data is used, only a portion of the additionally fetched data is used, then the bandwidth and power required to fetch the unused additional data did not improve performance and may have slowed down other memory accesses.

In one example, to minimize the impact on interconnect bus 114 of read requests that request more blocks of data than are required for by an initial load request, MM 128 may select, with a read request, to set a variable setting, as illustrated at reference numeral 132. In one example, MC 116 may include a bandwidth controller (BC) 122 that detects read requests with variable settings in queue system 118 and may select to optimize scheduling and performance on interconnect bus 114 by reducing the read request data size that is returned over memory interface bus 124 for the read request. In one example, a variable setting with the read request may include, but is not limited to, a particular bit set indicating that the read request return data size may be variable and one or more alternative reduced data sizes. In one example, for example, a variable setting may include a variable bit set and a particular reduced data size, such as 8X. In another example, a variable setting may include a variable bit set and a bit set indicating one or more relative size reductions, such as a bit set for a 25% data size reduction, a bit set for a 50% data size reduction, or a bit set for a 75% data size reduction.

In one example, MM 128 may select to mark a particular read request with a variable setting if MM 128 determines that MM 128 could handle a maximum data size, such as 16X, but that MM 128 may also accept a reduced data size, such as 8X. For example, if MM 128 detects that after a threshold number read requests set with a maximum data size of 16X, MM 128 is only using 8X or none of the additional data returned, MM 128 may determine that for subsequent read requests, MM 128 may handle the maximum data size of 16 X, but that MM 128 may also accept a reduced data size and continue to operate efficiently. In additional or alternate examples, MM 128 may select whether to mark a read request with a variable setting based on additional or alternate types of factors.

In one example, as the "read request, address, 16X, with variable setting" request illustrated reference numeral 132 is received into queue system 118, since the read request includes a variable setting, the queued read request is marked with the variable setting. In one example, queue system 118 may include read requests marked with a variable setting and read requests not marked with a variable setting.

In one example, BC 122 may schedule the "read request, address, 16X, with variable setting" request, illustrated at reference numeral 132, as a read command to fetch a data block of a size 16X from memory device starting at a bank, row, and column identified for the address, as illustrated at reference numeral 134. In one example, in response to scheduling the read command for the bank, row and column, with the data size set to 16X as illustrated at reference numeral 134, memory device 126 may access and return fetched data 138 via memory interface bus 124 of the data size requested of 16X.

In one example, queue system 118 may queue the read request for return with fetched data 138, including the variable setting marker for the read request, into outbound queue 146. In one example, scheduler 120 manages scheduling of the read request return data from outbound queue 146 onto interconnect bus 114, as illustrated at reference numeral 140. In one example, scheduler 120 may prepare fetched data 138 to be returned as one or more packets of one or more sizes, depending on the data width of the socket available in interconnect bus 114 for passing fetched data 138 and depending on the size of the data returned in the read request return data illustrated at reference numeral 140.

In one example, to determine whether to reduce a read request return data size for a read request with a variable setting and optimize performance on interconnect bus 114, BC 122 may monitor the utilization of interconnect bus 114 during a time window. In one example, BC 122 may monitor the utilization of interconnect bus 114 during a time window by monitoring the number of read request returns that are waiting in outbound queue 146 during a time window.

In one example, if BC 122 detects that the utilization of interconnect bus 114 during the time window exceeds a threshold, such as exceeding a threshold number of read request returns waiting in outbound queue 146, BC 122 may select to dynamically reduce the read request return data size for read requests that include a variable setting, and are waiting in queue system 118 to return to core 110 on interconnect bus 114. For example, if BC 122 detects that the utilization of interconnect bus 114 during the time window does not exceed a threshold, BC 122 may schedule the "fetched data 16X" illustrated at reference numeral 138, as "return 16X of fetched data", as illustrated at reference numeral 142. In contrast, if BC 122 detects that the utilization of interconnect bus 114 during the time window does exceed a threshold, BC 122 may schedule the "fetched data 16X" illustrated at reference numeral 138, as "return 16X of fetched data", as illustrated at reference numeral 142. In the example, returning 8X of the fetched data illustrated at reference numeral 144 may require fewer packets and less bandwidth on interconnect 114 than is required for returning 16X of the fetched data illustrated at reference numeral 142.

In one example, MM 128 may track responses to read requests, and in response to detecting the read request return data illustrated at reference numeral 140, MM 128 may direct the caching of the read request return data illustrated at reference numeral 140 in local cache 112. In one example, if MM 128 does not set a variable setting in a read request packet, MM 128 may track whether the read request return data is returned and whether the returned data has a data size matching the maximum requested data size. In one example, if MM 128 does set a variable setting in a read request packet sent to memory device 126, as illustrated at reference numeral 132, then MM 128 may track whether the read request return data is returned at the maximum requested data size or one or more reduced sizes.

In one example, by reducing the read request return data size of read requests with variable settings waiting in queue system 118, to reduce the number of data packets required on interconnect 114 for returning data for a read request, BC 122 may optimize the use of interconnect bus 114 when interconnect utilization exceeds a threshold. In particular, the read requests with variable settings with read request return data queued in queue system 118 may represent read requests for a block of data that is multiple times larger than the initial size of data requested in a load command at a core. During a time window when use of interconnect bus 114 exceeds a threshold, utilization of interconnect bus 114 may be optimized for a next time window by reducing the read request return data size of read requests with variable settings because if the read request return data is a reduced size, the use of interconnect bus 114 is reduced and core 110 still receives the data required for the load request, along with a reduced size of additional data for storing in local cache 112, for improving the chance of a hit in local cache 112 for a next load instruction.

Figure 2:
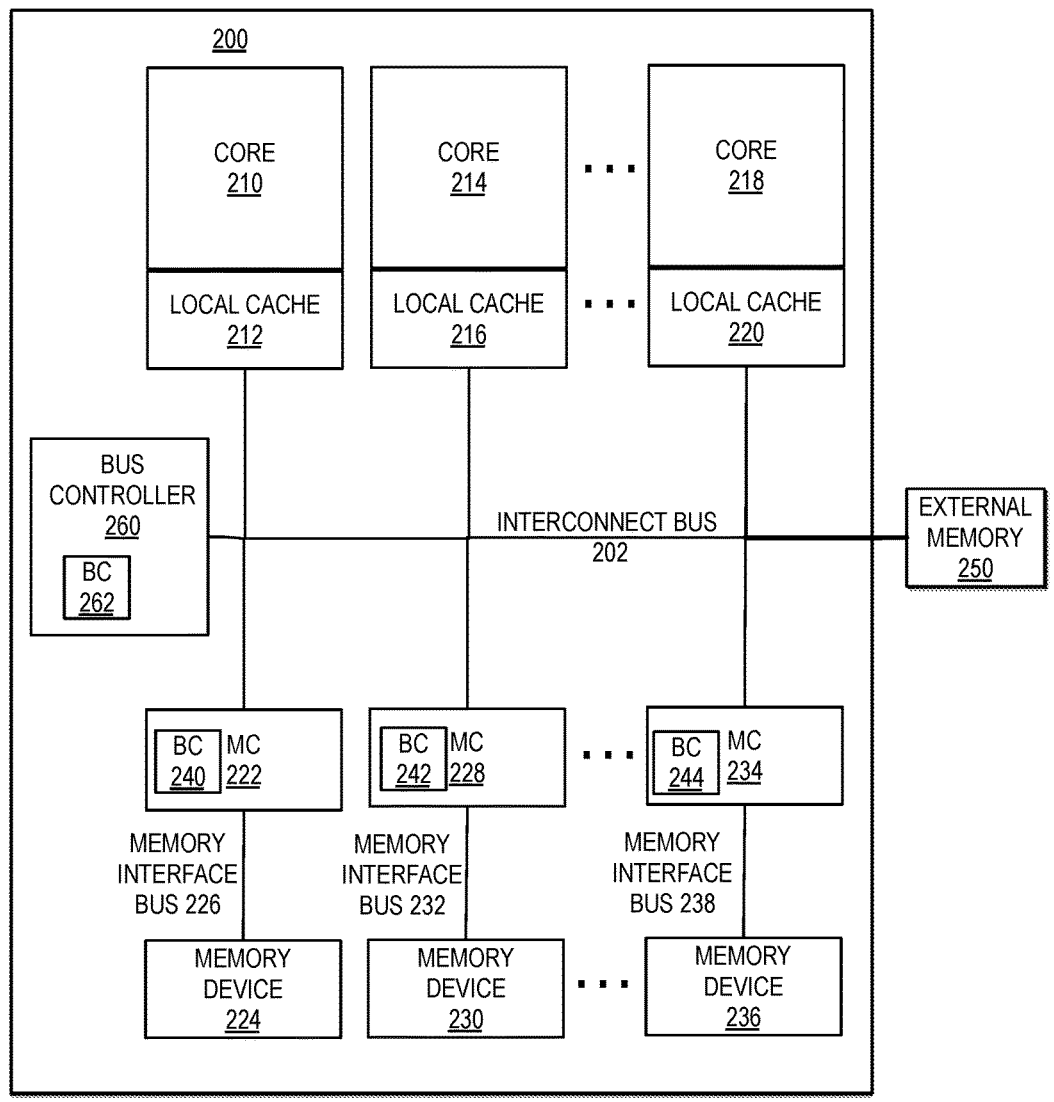
FIG. 2 illustrates one example of a block diagram of multiple off-chip memory devices, each controlled by a separate memory controller for dynamically adjusting read data return sizes for each separate memory device based on interconnect bus utilization to reduce read request return data traffic on the interconnect bus.

FIG. 2 illustrates a block diagram of one example of multiple off-chip memory devices, each controlled by a separate memory controller for dynamically adjusting read data return sizes from memory controllers for each separate memory device based on interconnect bus utilization to reduce read return data traffic on the interconnect bus.

In one example, a computer system 200 may include multiple cores, where a selection of the multiple cores may include a core 210, a core 214, and a core 218. In one example, each of the cores may be integrated with a separate local cache, such as local cache 212 integrated with core 210, local cache 216 integrated with core 214, and local cache 220 integrated with core 218.

In one example, each of core 210, core 214, and core 218 may connect, via an interconnect bus 202, with one or more off-core memory devices, such as a memory device 224, a memory device 230, and a memory device 236, and with one or more off-chip or external memory devices, such as an external memory 250. In one example, each of memory device 224, memory device 230, and memory device 236 may represent DRAM, as described with respect to memory device 126. In one example, computer system 200 may represent a system on a chip. In one example, external memory 250 may represent one or more types of off-chip data storage including, but not limited to, external hard drives, discs, and USB thumb drives.

In one example, access to memory device 224 is managed by an MC 222 via a memory interface bus 226, access to memory device 230 is managed by an MC 228 via a memory interface bus 232, and access to memory device 236 is managed by an MC 234 via a memory interface bus 238. In one example, each of MC 222, MC 228, and MC 234 may represent a memory controller that performs the functions described for MC 116. In particular, MC 222 may include a BC 240, MC 228 includes a BC 242, and MC 234 includes a BC 244, where each of BC 240, BC 242, and BC 244 may represent a bandwidth controller that performs the functions described for BC 122.

In one example, interconnect bus 202 may include a bus controller 260 for managing packet travel on interconnect bus 202 and balancing the scheduling of traffic from each of the devices. In one example, bus controller 260 may manage, for each period of time, which devices may pass packets between one another via interconnect bus 202. In one example, multiple devices within computer system 200 and external memory 250 may share a same set of physical connections via interconnect bus 202 and bus controller 260 manages which devices are selected as read or write masters during each clock cycle, for pushing and receiving packets. For example, bus controller 260 may designate core 210 and MC 222 as masters for a clock cycle on a particular channel of interconnect bus 202, allowing packets to flow from core 210 to MC 222 or from MC 222 to core 210 on the particular channel. In another example, bus controller 260 may designate core 214 and external memory 250 as masters for a clock cycle on a particular channel of interconnect bus 202, allowing packets to flow from core 214 to external memory 250 on the particular channel. In additional or alternate embodiments, bus controller 260 may control packet scheduling on interconnect bus 202 using one or more scheduling management rules based on the types of physical infrastructure of interconnect bus 202, the timing constraints implemented for managing packet flow on the infrastructure, and one or more load balancing settings for balancing the load between multiple memories and cores.

In one example, when MC 222, MC 228, MC 234 or external memory 250 is ready to return the data for a read request from an outbound queue to requesting core, the MC or external memory 250 may send a request signal to bus controller 260 during a first clock cycle for permission to pass a read return response on interconnect bus 202 to the requesting core. In response to receiving the read return response signal, bus controller 260 may send a grant signal to the requesting MC or external memory 250. In response to receiving the grant signal, the MC or external memory 250 receiving the grant signal may place one or more packets for the read request return data onto interconnect bus 202.

In one example, one or more of core 210, core 214, and core 218 may each include a memory manager, such as MM 128, that is enabled, when sending a read request on interconnect bus 202, to mark the read request with a variable setting, if permissible, to indicate that read request return data of variable sizes may be returned for the read request. In one example, each of the cores may mark the read request with a variable setting with a separate reduced data size. For example, core 210 may send a read request for 16X with a variable setting and reduced data size of 8X, but core 212 may send a read request for 32X with a variable setting and multiple reduced data sizes of 16X or 8X. In additional or alternate examples, other examples of read request sizes and variable settings with reduced data sizes may be specified.

In one example, while a single core interacting with a single memory controller may not competing for scheduling on interconnect bus 202 during a time period, when interconnect bus 202 includes one or more cores, one or more memory controllers for one or more memory devices, and an external memory 250 connected to interconnect bus 202, each of the one or more memory controllers may compete for scheduling on interconnect bus 202, which may result in read request return data filling up in the outbound queue of one or more memory controllers. In particular, while an MC may have access to interconnect bus 202 at a bandwidth that is oversized even for memory requests that are the maximum return data size, if other MCs and external memory are taking up bandwidth on interconnect bus 202, the outbound queue of an MC with oversized bandwidth may still fill up because the MCs access to interconnect bus 202 is limited. In addition, while different MCs may have access to interconnect bus 202 at different bandwidths, external memory 250 may connect to interconnect bus 202 at a bandwidth that is lower by half or more than the bandwidths of the different MCs, such that when external memory 250 is the source transferring packets on interconnect bus 202, data transfers on interconnect bus 202 may take longer than when an MC is a source transferring packets on interconnect bus 202.

If the outbound queue of an MC is filled up beyond a particular threshold, the overall performance of computer system 200 may be negatively impacted by delays in cores waiting for read return request data. By reducing the number of packets required for read request return data, the read return data traffic on interconnect bus 202 may be optimized, to improve performance of computer system 200, by reducing the amount of data traffic required for returning additional data in a data request by reducing the amount of additional data returned. In one example, where bus controller 260 designates a core as a read master for the memory to return fetched data to a core, by reducing the read request return data size, bus controller 260 may allow more read masters to receive data in a given time because each read master receives less data, in fewer packets, for read request return data that is reduced in size.

In one example, while a single core interacting with a single memory controller may have a limit on the number of memory access requests sent to the memory controller each time window, when multiple cores are connected to a single memory device or multiple memory devices on interconnect bus 202, multiple cores may send multiple memory access requests to a single memory device during a time window. With the potential for multiple cores to send multiple memory access requests, which may be different data sizes, to any of MC 222, MC 228, and MC 234 during a time window, one MC may have more memory requests to handle during a time period than other MCs and one MC may also have more read request return data to handle during a time period than other MCs, such that each MC may implement a separate BC to optimize the use of interconnect bus 202.

In one example, the BC in each separate MC may monitor the utilization of interconnect bus 202 by that MC during a programmable window by monitoring how full the outbound queue for the MC is with read request returns, and if a threshold is reached at the MC, for any read requests with a variable setting waiting for dispatch on interconnect bus 202, the BC at the MC reduces the data size of the read request return data. In one example, a same time window or different time windows may be applied at each BC.

In one example, BC 240 may detect, during a time window selected for MC 222, that the utilization of interconnect bus 202 exceeds a threshold selected for MC 222. Once BC 240 detects that the utilization of interconnect bus 202 exceeds the threshold, BC 240 may reduce the data size of the read request return data waiting during a next time window, for each read request that has a variable setting. For example, MC 222 may have an outbound queue with read request return data for a read request with a variable setting received from core 210, read request return data for a read request with a variable setting received from core 214, and read request return data for a read request without a variable setting received from core 218. BC 240 may reduce the maximum read request return data size for the read request with a variable setting received from core 210 to a reduced data size, such that MC 222 returns a fetched data block of the reduced data size, as read request return data to core 210. BC 240 may reduce the maximum read request return data size for the read request with a variable setting received from core 214 to a reduced data size, such that MC 222 returns a fetched data block of the reduced data size, as read request return data to core 214. BC 240 may maintain the maximum read request return data size specified in the read request without a variable setting received from core 218, such that MC 222 returns a fetched data block of the maximum read request return data size, as read request return data to core 214.

In one example, BC 242 may detect, during a time window selected for MC 228, that the utilization of interconnect bus 202 exceeds a threshold selected for MC 228. Once BC 242 detects that the utilization of interconnect bus 202 exceeds the threshold, BC 242 may reduce the data size of the read request return data waiting during a next time window, for each read request that has a variable setting. For example, MC 228 may have an outbound queue with read request return data for a read request with a variable setting received from core 210, read request return data for a read request with a variable setting received from core 214, and read request return data for a read request without a variable setting received from core 218. BC 242 may reduce the maximum read request return data size for the read request with a variable setting received from core 210 to a reduced data size, such that MC 222 returns a fetched data block of the reduced data size, as read request return data to core 210. BC 242 may reduce the maximum read request return data size for the read request with a variable setting received from core 214 to a reduced data size, such that MC 228 returns a fetched data block of the reduced data size, as read request return data to core 214. BC 242 may maintain the maximum read request return data size specified in the read request without a variable setting received from core 218, such that MC 228 returns a fetched data block of the maximum read request return data size, as read request return data to core 214.

In one example, in addition to a BC detecting whether the utilization of interconnect bus 202 exceeds a threshold to determine whether to reduce the read request return size for a read request with a variable setting, a BC, such as BC 240, BC 242, and BC 244, may also determine whether the read master, such as core 210, core 214, or core 218, sending the read request is a location that has a lower bandwidth connection in interconnect bus 202. For example, core 210 may represent a read master with a bandwidth connection of 128 Mbytes/second, while core 214 may represent a read master with a bandwidth connection of 64 Mbytes/second. In one example, queue system 118, in outbound queue 146, may track whether the connection for the read master is a lower bandwidth connection. In one example, if the utilization of interconnect bus 202 exceeds a first threshold and there are read request returns waiting for core 210 and core 214, the BC may select to reduce the read request return data size for the return to core 214, on the lower bandwidth connection of 64 Mbytes/second, but not reduce the read request return data size for the return to core 210, on the higher bandwidth connection. In contrast, if the utilization of interconnect bus 202 exceeds a second, fuller threshold and there are read request returns waiting for core 210 and core 214, the BC may select to reduce the read request return data size for the return to both core 210 and core 214, regardless of the bandwidth of the connections.

In one example, in addition to or as an alternative to a BC running in one or more of MC 222, MC 228, and MC 234, bus controller 260 may also run a BC, illustrated as BC 262. In one example, bus controller 260 may receive a load request from each of core 210, core 214, and core 218, grant the core a channel in interconnect bus 202 for passing a read request, and track the load request. Bus controller 260 may also receive a return response request from each of MC 222, MC 228, MC 234, and external memory 250 and grant the memory a channel for interconnect bus 202. BC 262 may detect, in the loads sent to the memory controllers and external memory 250, whether there is a variable setting for read requests. BC 262 may track, for each of the load that is a read operation with a variable setting, whether the load is directed to an on-chip memory controller, within computer system 200, or directed to off-chip, external memory 250, where external memory 250 has a lower bandwidth connection to interconnect bus 202 than the on-chip memory controllers. In another example, if one on-chip memory controller has a lower bandwidth connection than another on-chip memory controller, BC 262 may track, for each of the operation loads that is a read operation with a variable setting, whether the read load is directed to a higher bandwidth or lower bandwidth memory location.

In one example, BC 262 may detect a condition on interconnect bus 202 that indicates that the utilization of interconnect bus 202 and may compare the utilization to a threshold. In one example, BC 262 may monitor utilization of interconnect 202 by tracking the number of loads received for interconnect bus 202 during a time window, the number of cycles of delay between a request signal and a data packet return signal, and other indicators of utilization or delays in responses on interconnect 202. In one example, if BC 262 detects that the utilization of interconnect bus 202 exceeds a threshold and there are read loads with variable settings directed to a lower bandwidth location, BC 262 may select to send a signal on interconnect bus 202 to throttle down the read request return data sizes on the lower bandwidth locations, by reducing the read request return data sizes of read requests with variable settings. In another example, BC 262 may also select to send a signal on interconnect bus 202 to all memory controllers and external memory 250 to throttle down the read request return data sizes by reducing the read request return data sizes of read requests with variable settings. In one example, one or more of MC 222, MC 228, MC 234 and external memory 250 may be configured to receive a throttle signal from bus controller 260 and to reduce the read request return data sizes of read request returns with variable settings.

FIG. 3 illustrates a block diagram of one example of a bandwidth controller for dynamically adjusting read request return data sizes based on interconnect bus utilization to optimize read data traffic on the interconnect bus.

In one example, BC 118 may include a threshold detector 310. Threshold detector 310 monitors utilization of the interconnect bus between a memory controller and one or more cores, one or more other memory controllers, and external memory. In one example, threshold detector 310 may sample the interconnect bus utilization during a time window of a length specified in a time window setting 314. For example, threshold detector 310 may sample the depth of an outbound read request return queue during a time window of 500 nanosecond (ns). In one example, time window setting 314 may be a static setting of a time window loaded into time window settings 314. In another example, time window setting 314 may be a dynamically adjustable setting that may be selected and adjusted by a memory controller based on real-time performance metrics or may be adjusted based on inputs received by the memory controller.

In one example, threshold detector 310 may run continuously, sampling interconnect bus utilization for each time period of operation, or threshold detector 310 may be triggered to run at particular points in time. In one example, as threshold detector 310 is sampling interconnect bus utilization during a time window by detecting the number of read request returns waiting in outbound queue 146, if read request return data arrives in outbound queue 146 for a read request that includes a variable setting, threshold detector 310 may compare the sampled interconnect bus utilization during the time window with one or more threshold settings in threshold settings 312. In one example, if the sampled interconnect bus utilization during the time window exceeds at least one threshold setting in threshold settings 312, then threshold detector 310 triggers a size selection controller 316 to reduce the read data size of a next selection of read request return data for read requests with a variable setting waiting in outbound queue 146 of queue system 118.

In one example, threshold settings 312 may identify different threshold levels assigned to different amounts of sampled interconnect bus utilization matched. In one example, threshold settings 312 may include one or more static settings loaded into threshold settings 312. In another example, threshold settings 312 may include one or more dynamically adjustable settings that may be adjusted by a memory controller based on real-time performance metrics or may be adjusted based on an input received by the memory controller.

In one example, size selection controller 316 may select the reduced read data size based on one or more preferences set in reduced size options 318. In one example, each core, in specifying a read request with a variable setting, may specify the reduced size options in the read request in one or more different formats. In one example, to enable BC 118 to read size reductions for a single type or multiple types of read requests with variable settings, from multiple cores, BC 118 may include reduced size options 318 for applying a single format or different formats of reduced size options in read requests with variable settings.

In one example, reduced size options 318 may include a preference that if a read request is received with a variable setting with a single specific reduced data size, size selection controller 316 selects the single specific reduced data size as a reduced read data size. In another example, reduced size options 318 may include a preference that if a read request is received with a variable setting that includes a bit setting for the reduced data size, reduced size options 318 may specify the specific reduced data size corresponding with the bit setting. In another example, reduced size options 318 may include a preference that if a read request is received with a variable setting, but no bit size or setting, reduced size options 318 may specify the specific reduced data size corresponding with a threshold level setting. In another example, reduced size options 318 may include a preference that if a read request is received with a variable setting, but no bit size or setting, reduced size options 318 may specify the specific reduced data size for the specific maximum read data size in the read request. In one example, reduced size options 318 may include one or more static settings loaded into reduced size options 318. In another example, reduced size options 318 may include one or more dynamically adjustable settings that may be adjusted by a memory controller based on real-time performance metrics or may be adjusted based on an input received by the memory controller.

FIG. 4 illustrates one example of a block diagram of elements of threshold settings in a bandwidth controller for dynamically adjusting read data return sizes if interconnect bus utilization exceeds a threshold setting to optimize read data traffic on the interconnect bus.

In one example, threshold settings 312 includes a first column of activity level values, illustrated as activity level 410, and a second column of reduced size indicators, illustrated as reduced size 412. In one example, threshold settings 312 may include one or more settings with a level of activity specified in activity level 410 and a corresponding reduced size indicator specified in reduced size 412.

In the example, as illustrated at reference numeral 414, for an activity level of "75%", the reduced size level indicator is "level 1". In the example, as illustrated at reference numeral 416, for an activity level of "85%", the reduced size level indicator is "level 2". In the example, as illustrated at reference numeral 416, for an activity level of "90%", the reduced size level indicator is "level 3".

In one example, threshold detector 310 may detect, during a time window, the percentage of outbound queue 420 that is backed up with pending read request returns, in one example, by monitoring a position of a head pointer 422 pointing to a next read request return to be scheduled and a tail pointer 424, pointing to the most recently received read request return data, where outbound queue 420 is a first in, first out queue. In one example, threshold detector 310 may calculate a number of queue position filled between head pointer 422 and tail pointer 424 and then calculate the percentage of the total queue positions of outbound queue 420 are filled. In additional or alternate examples, outbound queue 420 may include a counter that counts a number of queue positions filled, where the counter is increased as read request return data is received and the counter is decreased as read request return data is returned on the interconnect bus. In one example, based on the counter value, threshold detector 310 may calculate a percentage of the total queue positions of outbound queue 420 that are filled for the time window. In additional or alternate examples, threshold detector 310 may calculate percentages of utilization on the interconnect bus through additional or alternate monitoring services.

In one example, as illustrated at reference numeral 414, if threshold detector 310 detects that the percentage of queue usage of outbound queue 420 reaches a level of "75%" of the queue length available, threshold detector 310 may trigger size selection controller 316 to reduce the data size of the read request return data of one or more read requests with variable settings in outbound queue 420 for a reduced size of "level 1". In one example, as illustrated at reference numeral 416, if threshold detector 310 detects that the percentage of queue usage of outbound queue 420 reaches a level of "85%" of the queue length, threshold detector 310 may trigger size selection controller 316 to reduce the data size of the read request return data of one or more read requests with variable settings for a reduced size of "level 2". In one example, as illustrated at reference numeral 418, if threshold detector 310 detects that percentage of queue usage of memory bus interface reaches a level of "90%" of the queue length, threshold detector 310 may trigger size selection controller 316 to reduce the data size of one or more read requests with variable settings for a reduced size of "level 3".

While FIG. 4 illustrates threshold settings 312 with three threshold levels specified, in additional or alternate examples, threshold settings 312 may include a single level or additional levels. In addition, in additional or alternate examples, threshold settings 312 may include activity levels that are specified for a specific type of activity that uses bandwidth.

FIG. 5 illustrates one example of a block diagram of elements of reduced size option settings in a bandwidth controller for dynamically reducing read data return sizes according to the reduced size options settings if interconnect bus utilization exceeds a threshold setting to optimize read request return data traffic on the interconnect bus.

In one example, a read request with a variable setting may include a reduced data size setting. For example, a read request with a variable setting may include no reduced data size setting. In another example, a read request with a variable size setting may include a bit setting of one or more bits. In one example, a read request with a variable setting may include a single bit setting selecting a threshold setting.

In one example, reduced size options 318 may include a first column of reduced sizes 510, a second column of bit settings 512, and a third column of threshold settings 514. In one example, a first setting illustrated at reference numeral 520 includes a reduced size setting of 50% of the maximum data size, if the read request with a variable setting does not include a reduced data size setting, illustrated by "n/a", or if the read request with a variable setting includes a bit setting of "00". In one example, a second setting illustrated at reference numeral 522 includes a reduced size setting of 25% of the maximum data size, if the read request with a variable setting includes a bit setting of "01" or has a bit set for a threshold setting and the threshold setting is "level 1". In one example, a third setting illustrated at reference numeral 524 includes a reduced size setting of 50% of the maximum data size, if the read request with a variable setting includes a bit setting of "10" or has a bit set for a threshold setting and the threshold setting is "level 2". In one example, a fourth setting illustrated at reference numeral 526 includes a reduced size setting of 75% of the maximum data size, if the read request with a variable setting includes a bit setting of "11" or has a bit set for a threshold setting and the threshold setting is "level 3".

While FIG. 5 illustrates reduced size options 318 with four settings specified, in additional or alternate examples, reduced size options 318 may include a single setting or additional settings. In addition, in additional or alternate examples, reduced size options 318 may include additional types of settings in the read request or activity values detected by the bandwidth controller, that are assigned to reduced sizes.

FIG. 6 illustrates one example of a block diagram of multiple read request returns waiting in an outbound queue, including multiple read request returns for read requests with a variable size setting.

In one example, an outbound queue 600 of a memory controller, such as outbound queue 146, includes multiple queued read request returns. In one example, each queued read request return may include a core ID 610, a selected data size 612, a variable setting 614, a reduced data setting 616, and a bandwidth 618. In one example, the amount of data returned for each read request, from what is fetched, is specified by selected data size 612 at the time of scheduling onto interconnect bus 114 by scheduler 120. In one example, at the time of scheduling of each read request return, if the variable setting for the read request is on, then threshold detector 310 determines whether the interconnect utilization during a time window exceeds a threshold, and if the threshold is exceeded, size selection controller 316 reduces the selected data size before the read request is scheduled on a memory interface bus.

In one example, a queued read request return 620, from "core 1", originally includes a maximum data size of "16X", a variable size setting of "ON", and a reduced data size of "8X", which is a specific data size. In the example, threshold detector 310 detects, when read request return 620 arrives, that a level of interconnect utilization during the time window exceeds a first threshold, identified as "level 1", according to threshold settings 312. In the example, because the interconnect utilization during the time window exceeds the first threshold, size selection controller 316 is triggered to reduce the selected data size of read request return 620. In the example, the reduced data setting received with read request return 620 is specified as "8X", therefore size selection controller 316 reduces the selected data size for read request return 620 from "16X" to "8X".

In one example, a queued read request return 622, from "core 3", originally includes a maximum data size of "16X", a variable size setting of "OFF", and no reduced data size. In the example, threshold detector 310 is not triggered to monitor read request return 622 and the selected data size remains the maximum data size of "16X".

In one example, a queued read request return 624, from "core 4", originally includes a maximum data size of "16X", a variable size setting of "ON", and a reduced data size of "01", which is a bit setting corresponding with a 25% reduced size in reduced size options 318. In the example, threshold detector 310 detects, when read request return 624 arrives, that a level of interconnect utilization during the time window does not exceed any of the thresholds according to threshold settings 312. In the example, because the interconnect utilization during the time window does not exceed the first threshold, size selection controller 316 is not triggered to reduce the selected data size of read request return 624.

In one example, a queued read request return 626, from "core 2", originally includes a maximum data size of "32X", a variable size setting of "ON", and a reduced data size of "threshold". In the example, threshold detector 310 detects, when read request return 626 arrives, that a level of interconnect utilization during the time window exceeds a second threshold, identified as "level 2", according to threshold settings 312. In the example, because the interconnect utilization during the time window exceeds the second threshold, size selection controller 316 is triggered to reduce the selected data size of read request return 626. In the example, the reduced data setting received with read request return 626, is based on the threshold. In FIG. 5, setting 524 specifies that for a threshold level of "level 2", the reduced size setting is 50% of the maximum data size. In the example, size selection controller 316 reduces the selected data size for read request return 626 from "32X" to 50% of "32X", which is "16X".

While FIG. 6 illustrates read queue 600 with examples of four read requests, in additional or alternate examples, read queue 600 may include additional or alternate types of read requests and may queue additional data with each read request.

FIG. 7 illustrates one example of a block diagram of multiple loads tracked in a queue at a bus controller, including multiple loads for read requests with a variable size setting, indicating whether the target of the load is a lower bandwidth memory device.

In one example, a load queue 700 of a bandwidth controller in a bus controller tracks the multiple load operations received for read requests. In one example, each queued load may include a core ID 710, a variable setting 714, and a lower bandwidth setting 718. In particular, in one example, BC 262 of bus controller 260 may detect, in each load, whether a variable setting bit is turned on, and set variable setting 714. In addition, in one example, BC 262 may detect whether the target of the load is an on-chip, higher bandwidth memory controller or an off-chip, lower bandwidth external memory and mark lower bandwidth setting 718 with an indicator of whether the target of the load is a lower bandwidth.

In one example, BC 262 may determine, if there are any loads with a variable setting on within load queue 700 and a low bandwidth setting. In one example, if a load includes a variable setting with a low bandwidth setting, BC 262 may determine whether an amount of utilization of interconnect bus 202 during a time window exceeds a threshold. For example, a queue load entry 720, from "core 1", has a variable setting of "ON" and a lower bandwidth setting of "YES". In another example, a queue load entry 722, from "core 2", does not have a variable setting or a lower bandwidth setting. In one example, each of a queue load entry 724, from "core 4", and a queue load entry of 726, have a variable setting of "ON", but do not have a lower bandwidth setting.

In one example, based on the entries in load queue 700, for queue load entry 720, with the variable setting and lower bandwidth on, BC 262 may determine whether utilization of interconnect bus 202 during a time window exceeds a threshold, such as a threshold level of "level 1". In one example, if BC 262 detects that the utilization of interconnect bus 202 during a time window exceeds the threshold level of "level 1", BC 262 may direct bus controller 260 to send a throttle signal to external memory 250, and other lower bandwidth memory devices, to direct external memory 250 and other lower bandwidth memory devices to reduce the data size of read request return data.

While FIG. 7 illustrates load queue 700 with examples of four loads, in additional or alternate examples, load queue 700 may include additional or alternate types of loads and may queue additional data with each load.

Figure 8:
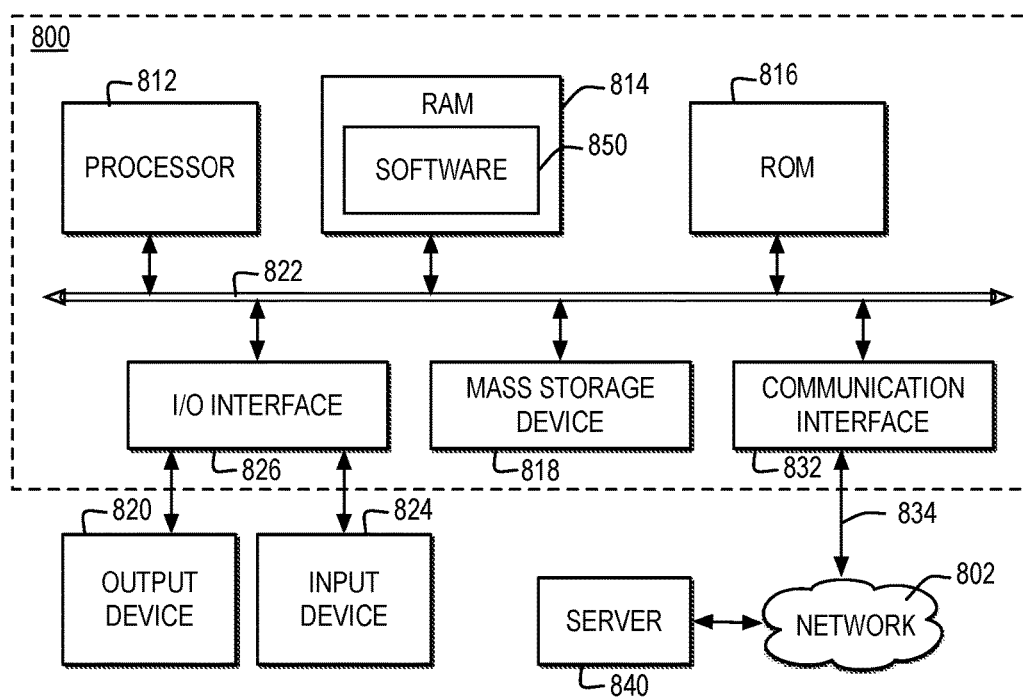
FIG. 8 illustrates one example of a block diagram of a computer system in which one embodiment of the invention may be implemented.

FIG. 8 illustrates a block diagram of one example of a computer system in which one embodiment of the invention may be implemented. The one or more embodiments of the present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

Figures 9, 10:
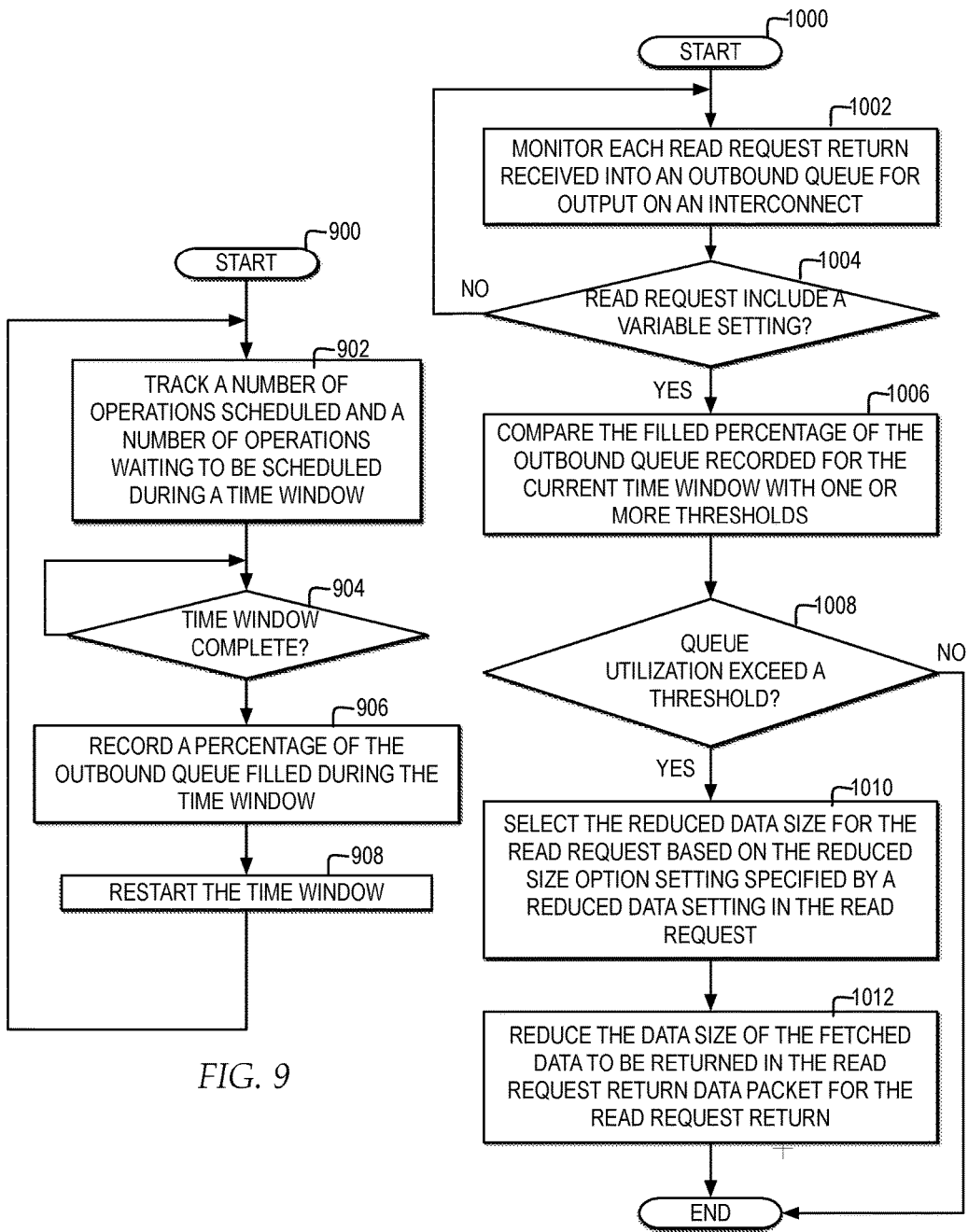
FIG. 9 illustrates one example of a high level logic flowchart of a process and computer program for tracking interconnect bus utilization over time windows.
FIG. 10 illustrates one example of a high level logic flowchart of a process and computer program for dynamically adjusting read data return sizes based on interconnect bus utilization to optimize read request return data traffic on the interconnect bus.

In one embodiment, the operations performed by processor 812 may control the operations of flowchart of FIGS. 9-10 and other operations described herein. Operations performed by processor 812 may be requested by software 850 or other code or the steps of one or more embodiments of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-10.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In one or more alternate embodiments of the invention, additional or alternate input and output peripheral components may be added.

With respect to FIG. 8, the one or more embodiments of the invention may be a system, a method, and/or a computer program product. The computer program product may include a computer readable storage medium (or media) having computer readable program instructions thereon for causing a processor to carry out aspects of the one or more embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software project, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more embodiments of the invention.

Aspects of one or more embodiments of the invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to one or more various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to one or more embodiments of the invention.

FIG. 9 illustrates a high level logic flowchart of a process and computer program for tracking memory interconnect bus utilization over time windows.

In one example, the process and computer program start at block 900 and thereafter proceed to block 902. Block 902 illustrates tracking a number of operations scheduled and a number of operations waiting to be scheduled during a time window. Next, block 904 illustrates a determination whether the time window is complete. If the time window is complete, then the process passes to block 906. Block 906 illustrates recording a percentage of the outbound queue filled during the time window. Next, block 908 illustrates restarting the time window, and the process returns to block 902.

FIG. 10 illustrates a high level logic flowchart of a process and computer program for dynamically adjusting read data return sizes at a memory controller based on memory interconnect bus utilization to optimize read data traffic on a memory interconnect bus.

In one example, the process and program starts at block 1000 and thereafter proceeds to block 1002. Block 1002 illustrates monitoring each read request return received into an outbound queue for output on an interconnect bus. Next, block 1004 illustrates a determination whether a read request includes a variable setting. At block 1004, if a read request does not include a variable setting, then the process returns to block 1002. At block 1004, if a read request includes a variable setting, then the process passes to block 1006. Block 1006 illustrates comparing the filled percentage of the output queue recorded for a current time window with one or more thresholds. Next, block 1008 illustrates a determination whether the queue utilization exceeds a threshold. At block 1008, if the queue utilization does not exceed the threshold, then the process ends. At block 1008, if the queue utilization exceeds the threshold, then the process passes to block 1010.

Block 1010 illustrates selecting the reduced data size for the read request based on the reduced size option setting specified by a reduced data setting in the read request. Next, block 1012 illustrates reducing the data size of the fetched data to be returned in the read request return packet for the read request return, and the process ends.

The terminology used herein is for the purpose of describing particular embodiments only and is not intended to be limiting of one or more embodiments of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to one or more embodiments of the invention in the form disclosed. Many modifications and variations will be apparent to those of ordinary skill in the art without departing from the scope and spirit of the one or more embodiments of the one or more embodiments of the invention. The embodiment was chosen and described in order to best explain the principles of the one or more embodiments of the invention and the practical application, and to enable others of ordinary skill in the art to understand the one or more embodiments of the invention for various embodiments with various modifications as are suited to the particular use contemplated.

While the one or more embodiments of the invention has been particularly shown and described with reference to one or more embodiments, it will be understood by those skilled in the art that various changes in form and detail may be made therein without departing from the spirit and scope of the one or more embodiments of the invention.

What is claimed is:

1. A memory system comprising:
    a memory controller coupled to one or more memory devices via a memory interface bus;
    the memory controller coupled to one or more core devices via an interconnect bus;
    the memory controller for receiving one or more memory requests from the one or more core devices via the interconnect bus;
    the memory controller for tracking utilization of the interconnect bus by tracking a selection of the one or more memory requests comprising one or more read request returns with fetched data from the one or more memory devices waiting for scheduling to return on the interconnect bus during a time window; and
    the memory controller, responsive to detecting utilization of the interconnect bus during the time window reaches a memory utilization threshold:
        detecting a particular level identified with the memory utilization threshold, from among a plurality of memory utilization thresholds each identified by a separate level, for at least one read request from among the selection of one or more memory requests;
        identifying a particular reduced read data size specified for the particular level, the particular reduced data size for the particular level selected from among at least two read data size options for the at least one read request of a maximum read data size and the reduced read data size that is less than the maximum read data size; and
        dynamically selecting a reduced read data size set to the particular reduced read data size for a size of the fetched data to be returned for the at least one read request.

2. The memory system according to claim 1, further comprising:
    the memory controller, responsive to detecting utilization of the interconnect bus during the time window is less than the memory utilization threshold, for selecting the maximum read data size for the size of data returned by the at least one read request.

3. The memory system according to claim 1, wherein the memory controller for tracking utilization of the interconnect bus by tracking a selection of the one or more memory requests passed to the memory controller and waiting for scheduling on the interconnect bus during a time window further comprises:
    the memory controller for monitoring, for each of the one or more memory requests received via the interconnect bus, whether the one or more memory requests includes a variable setting for the at least one read data size options; and
    the memory controller, responsive to detecting the at least one read request with the variable setting from among the selection of the one or more memory requests, for tracking utilization of the interconnect bus by tracking the selection of the one or more memory requests with fetched data from the one or more memory devices and waiting for scheduling to return on the interconnect bus during the time window.

4. The memory system according to claim 3, further comprising:
    the memory controller, responsive to detecting the at least one read request with the variable size options set from among the selection of the one or more memory requests, for detecting whether the at least one read operation is received from a particular core from the one or more core devices with a lower bandwidth connection to the interconnect bus, the interconnect bus connected to at least one core with a higher bandwidth connection, where the lower bandwidth connection receives less data per transfer than the higher bandwidth connection.

5. The memory system according to claim 1, further comprising:
    the memory controller for monitoring, for each of the one or more memory requests received via the interconnect bus, whether the one or more memory requests includes a variable setting for the at least one read data size options; and
    the memory controller, responsive to detecting the at least one read request with the variable setting from among the selection of the one or more memory requests, for comparing utilization of the interconnect bus during the time window with the memory utilization threshold.

6. The memory system according to claim 1, wherein the memory controller, responsive to detecting utilization of the interconnect bus during the time window reaches a memory utilization threshold, for dynamically selecting a reduced read data size for a size of the fetched data to be returned with at least one read request from among the selection of one or more memory requests, the reduced data size selected from among at least two read data size options for the at least one read request of a maximum read data size and the reduced read data size that is less than the maximum read data size, further comprises:
    the memory controller, responsive to detecting utilization of the interconnect bus during the time window reaches the memory utilization threshold, for dynamically selecting the reduced read data size for the size of the fetched data to be accessed from the one or more memory devices by the at least one read request with a variable setting from among the selection of the one or more memory requests, the variable setting specifying the maximum read data size and a setting for the reduced read data size.

7. The memory system according to claim 1, further comprising:
    the memory controller for receiving the one or more memory requests via the interconnect bus from a plurality of cores; and
    the one or more memory devices positioned off-core from the plurality of cores and only accessible to the plurality of cores via the interconnect bus.

8. The memory system according to claim 1, further comprising:
    the memory controller for requesting bandwidth on the interconnect bus from a bus controller for scheduling return of the fetched data for the selection of the one or more memory requests, the bus controller managing access to the interconnect bus to the one or more cores, the memory controller, and an external memory.

9. A method comprising:
    a computer system receiving one or more memory requests from one or more core devices via an interconnect bus, the one or more memory requests for accessing one or more memory devices via a memory interface bus;

the computer system tracking utilization of the interconnect bus by tracking for a selection of the one or more memory requests comprising one or more read request returns with fetched data from the one or more memory devices and waiting for scheduling to return on the interconnect bus during a time window; and the computer system, responsive to detecting utilization of the interconnect bus during the time window reaches a memory utilization threshold:

detecting a particular level identified with the memory utilization threshold, from among a plurality of memory utilization thresholds each identified by a separate level, for at least one read request from among the selection of one or more memory requests;

identifying a particular reduced read data size specified for the particular level, the particular reduced data size for the particular level selected from among at least two read data size options for the at least one read request of a maximum read data size and the reduced read data size that is less than the maximum read data size; and dynamically selecting a reduced read data size set to the particular reduced read data size for a size of the fetched data to be returned for the at least one read request.

10. The method according to claim 9, further comprising:
the computer system, responsive to detecting utilization of the interconnect bus during the time window is less than the memory utilization threshold, selecting the maximum read data size for the size of data returned by the at least one read request.

11. The method according to claim 9, wherein the computer system tracking utilization of the interconnect bus by tracking a selection of the one or more memory requests passed to the memory controller and waiting for scheduling on the interconnect bus during a time window further comprises:
the computer system monitoring, for each of the one or more memory requests received via the interconnect bus, whether the one or more memory requests includes a variable setting for the at least one read data size options; and
the computer system, responsive to detecting the at least one read request with the variable setting from among the selection of the one or more memory requests, tracking utilization of the interconnect bus by tracking the selection of the one or more memory requests with fetched data from the one or more memory devices and waiting for scheduling to return on the interconnect bus during the time window.

12. The method according to claim 11, further comprising:
the computer system, responsive to detecting the at least one read request with the variable size options set from among the selection of the one or more memory requests, detecting whether the at least one read operation is received from a particular core from the one or more core devices with a lower bandwidth connection to the interconnect, the interconnect comprising at least one core with a higher bandwidth connection, where the lower bandwidth connection receives less data per transfer than the higher bandwidth connection.

13. The method according to claim 9, further comprising:
the computer system monitoring, for each of the one or more memory requests received via the interconnect bus, whether the one or more memory requests includes a variable setting for the at least one read data size options; and
the computer system, responsive to detecting the at least one read request with the variable setting from among the selection of the one or more memory requests, comparing utilization of the interconnect bus during the time window with the memory utilization threshold.

14. The method according to claim 9, wherein the computer system, responsive to detecting utilization of the interconnect bus during the time window reaches a memory utilization threshold, dynamically selecting a reduced read data size for a size of the fetched data to be returned with at least one read request from among the selection of one or more memory requests, the reduced data size selected from among at least two read data size options for the at least one read request of a maximum read data size and the reduced read data size that is less than the maximum read data size further comprises:
the computer system, responsive to detecting utilization of the interconnect bus during the time window reaches the memory utilization threshold, dynamically selecting the reduced read data size for the size of the fetched data to be accessed from the one or more memory devices by the at least one read request with a variable setting from among the selection of the one or more memory requests, the variable setting specifying the maximum read data size and a setting for the reduced read data size.

15. The method according to claim 9, further comprising:
the computer system receiving the one or more memory requests via the interconnect bus from a plurality of cores, the one or more memory devices positioned off-core from the plurality of cores and only accessible to the plurality of cores via the interconnect bus.

16. The method according to claim 9, further comprising:
the computer system requesting bandwidth on the interconnect bus from a bus controller for scheduling return of the fetched data for the selection of the one or more memory requests, the bus controller managing access to the interconnect bus to the one or more cores, the memory controller, and an external memory.

17. A computer program product comprising one or more non-transitory computer-readable storage devices and program instructions, stored on at least one of the one or more storage devices, the stored program instructions comprising:
program instructions to receive one or more memory requests from one or more core devices via an interconnect bus, the one or more memory requests for accessing one or more memory devices via a memory interface bus;
program instructions to track utilization of the interconnect bus by tracking a selection of the one or more memory requests comprising one or more read request returns with fetched data from the one or more memory devices waiting for scheduling to return on the interconnect bus during a time window; and
program instructions to, responsive to detecting utilization of the interconnect bus during the time window reaches a memory utilization threshold:
  detecting a particular level identified with the memory utilization threshold, from among a plurality of memory utilization thresholds each identified by a separate level, for at least one read request from among the selection of one or more memory requests;

identifying a particular reduced read data size specified for the particular level, the particular reduced data size for the particular level selected from among at least two read data size options for the at least one read request of a maximum read data size and the reduced read data size that is less than the maximum read data size; and dynamically selecting a reduced read data size set to the particular reduced read data size for a size of the fetched data to be returned for the at least one read request.

18. The computer program product according to claim 14, the stored program instructions further comprising:

program instructions to, responsive to detecting utilization of the interconnect bus during the time window is less than the memory utilization threshold, select the maximum read data size for the size of data returned by the at least one read request.

\* \* \* \* \*